UNITED STATES PATENT OFFICE.

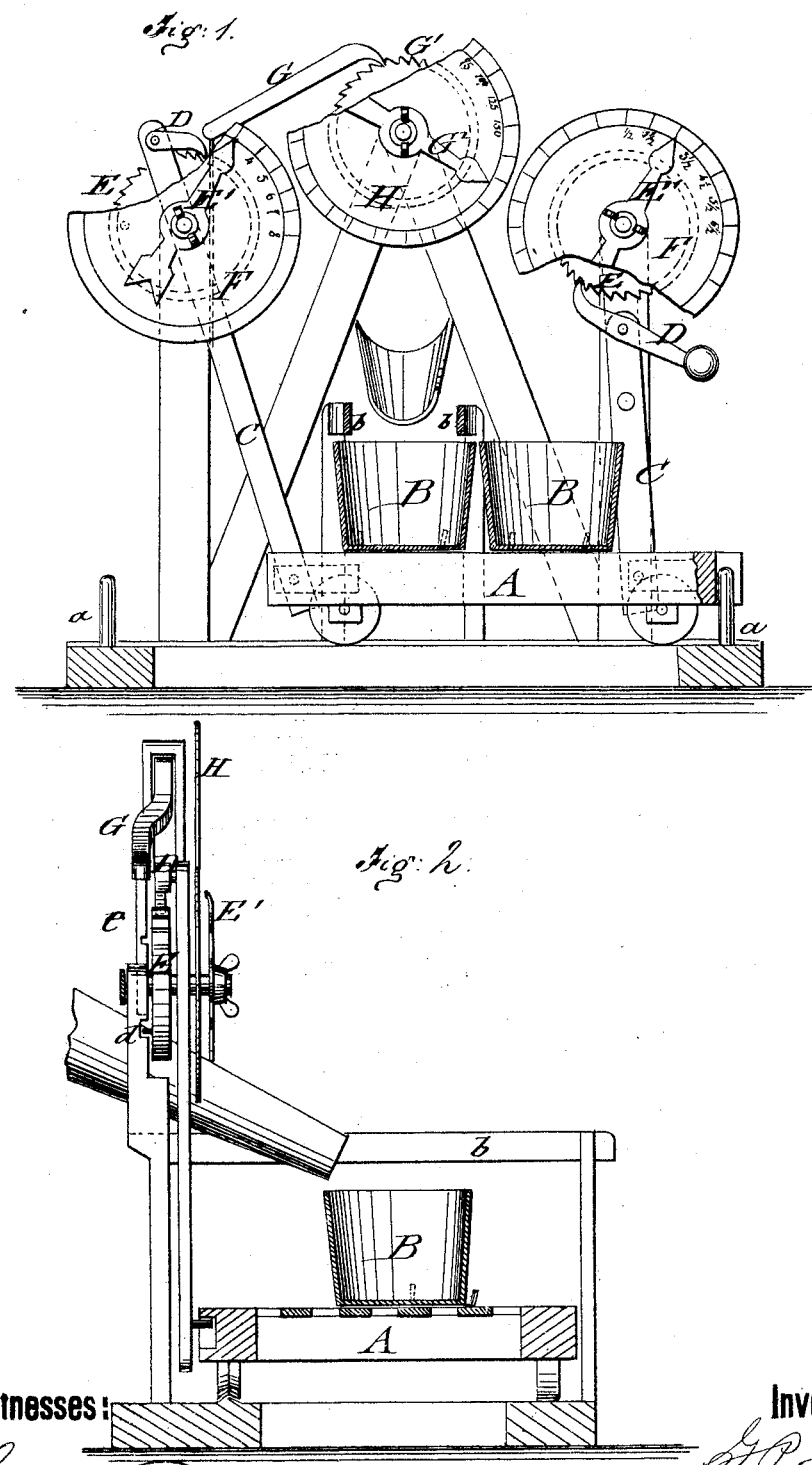

GEORGE P. FITTS, OF JACKSONVILLE, OREGON.

IMPROVEMENT IN GRAIN-TALLIES.

Specification forming part of Letters Patent No. 148,358, dated March 10, 1874; application filed November 15, 1873.

*To all whom it may concern:*

Be it known that I, GEORGE P. FITTS, of Jacksonville, in the county of Jackson and State of Oregon, have invented a new and Improved Grain-Tally, of which the following is a specification:

In the accompanying drawing, Figures 1 and 2, respectively, represent sectional front and side elevations of my improved grain-tally.

Similar letters of reference indicate corresponding parts.

The invention will first be fully described, and then pointed out in the claim.

A in the drawing represents a carriage of suitable size, which moves forward and backward on suitable guide-rails between stop-pins $a\ a$, which limit the extent of motion in either direction. The measure B, containing half a bushel, bushel, or other unit, is retained in position on the carriage by pegs, and placed under the spout of the threshing-machine, passing under cross-bars $b$ for equalizing the grain in the same. Carriage A is connected, by means of a pivoted lever, C, and pawl D, with a ratchet-wheel, E, the shafts of which carry an index, E′, indicating the number of measures on a fixed dial, F. Wheel E is provided with a pin, $d$, which connects, by a spring, $e$, and pawl G, with another cog-wheel, $G^1$, and index $G^2$, which registers, in the usual manner, the revolutions of wheel E on a dial, H.

If half-bushel measures are used, and it is desirable to keep also a tally of the number of half-bushels, a second lever-wheel and dial may be employed, so that on each movement of the carriage a half-bushel is registered.

The dials are graduated in the manner customary in registering devices, and indicate the exact number of units measured off from the thresher.

The attendant moves the carriage in one direction, when one measure is filled, and empties the same while the other measure is filled from the spout, moves then the carriage back, taking off the second measure when full, and repeats this operation, the registering device keeping a correct tally of the grain measured off, forming thus a very convenient self-acting apparatus for counting the number of measures.

Having thus described my invention, I claim as new and desire to secure by Letters Patent—

The combination, with movable carriage, ratchet, and rotating mechanism, of the levers C and pawls D G, arranged as described, and for the purpose specified.

GEORGE P. FITTS.

Witnesses:
C. W. KAHLER,
C. C. BEEKMAN.